United States Patent
Chiu

(10) Patent No.: US 9,001,269 B2
(45) Date of Patent: Apr. 7, 2015

(54) ACTUATOR WITH POSITION SENSOR AND CAMERA MODULE USING SAME

(71) Applicant: Chi-Wei Chiu, New Taipei (TW)

(72) Inventor: Chi-Wei Chiu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 109 days.

(21) Appl. No.: 13/693,049

(22) Filed: Dec. 4, 2012

(65) Prior Publication Data
US 2014/0009675 A1    Jan. 9, 2014

(30) Foreign Application Priority Data

Jul. 5, 2012 (TW) .............................. 101124158 A

(51) Int. Cl.
- *H04N 5/225* (2006.01)
- *G03B 13/34* (2006.01)
- *G03B 3/00* (2006.01)
- *G02B 7/08* (2006.01)

(52) U.S. Cl.
CPC ................ *H04N 5/2253* (2013.01); *G03B 3/00* (2013.01); *G02B 7/08* (2013.01)

(58) Field of Classification Search
CPC .................... H04N 5/2257; G03B 2205/0053; G03B 2205/0076

USPC ........................................... 348/374; 396/133
See application file for complete search history.

(56) References Cited

U.S. PATENT DOCUMENTS

| | | | |
|---|---|---|---|
| 2009/0003763 A1* | 1/2009 | Mohammed et al. | 385/14 |
| 2011/0096421 A1* | 4/2011 | Hirata et al. | 359/823 |
| 2011/0141584 A1* | 6/2011 | Henderson et al. | 359/811 |
| 2011/0235194 A1* | 9/2011 | Nobe et al. | 359/823 |

* cited by examiner

*Primary Examiner* — Sinh Tran
*Assistant Examiner* — Mark Monk
(74) *Attorney, Agent, or Firm* — Novak Druce Connolly Bove + Quigg LLP

(57) ABSTRACT

An actuator includes a base, a stationary frame fixed on the base, a movable frame received in the stationary frame, a SMA line, a guide pole, a position sensor, and a controller. The movable frame includes a resisting surface adjacent to the base, and defines a hole. The SMA line resists on the resisting surface. Two ends of the SMA line are fixed on the stationary frame. The guide pole is fixed on the base and extends through the hole. The position sensor detects the position of the movable frame. The controller supplies current to heat the SMA line to change the length of the SMA line, the SMA line drives the movable frame to move along the guide pole accordingly. The controller adjusts the current according to the position of the movable frame detected by the position sensor.

18 Claims, 3 Drawing Sheets

ACTUATOR WITH POSITION SENSOR AND CAMERA MODULE USING SAME

BACKGROUND

1. Technical Field

The present disclosure relates to an actuator and a camera module having the actuator.

2. Description of Related Art

A shape memory alloy (SMA) based actuator is used in a camera for driving lenses of the camera to move, to achieve auto-focusing function. Yet, the SMA based actuator cannot drive the lenses to move precisely.

Therefore, it is desired to provide an actuator and a camera module which can overcome the above-mentioned problems.

DETAILED DESCRIPTION

Figure 1:
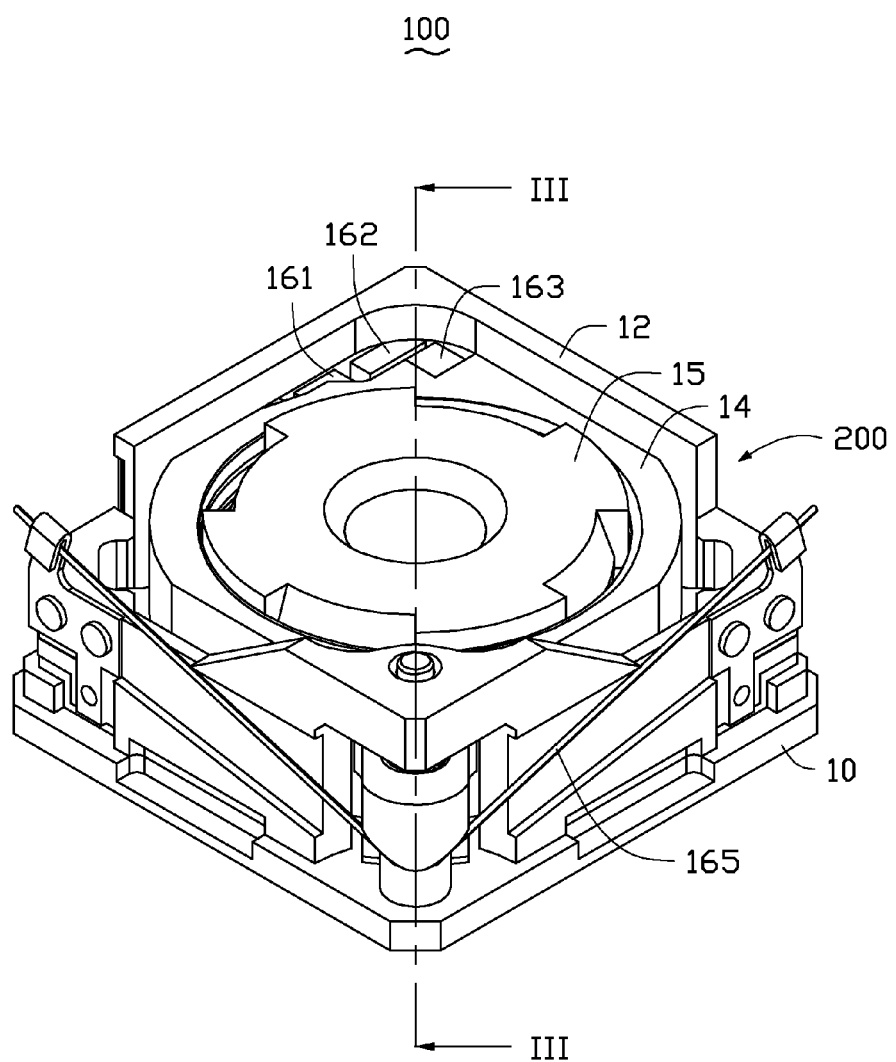
FIG. 1 is a schematic, isometric view of a camera module according to an embodiment.
Figure 2:
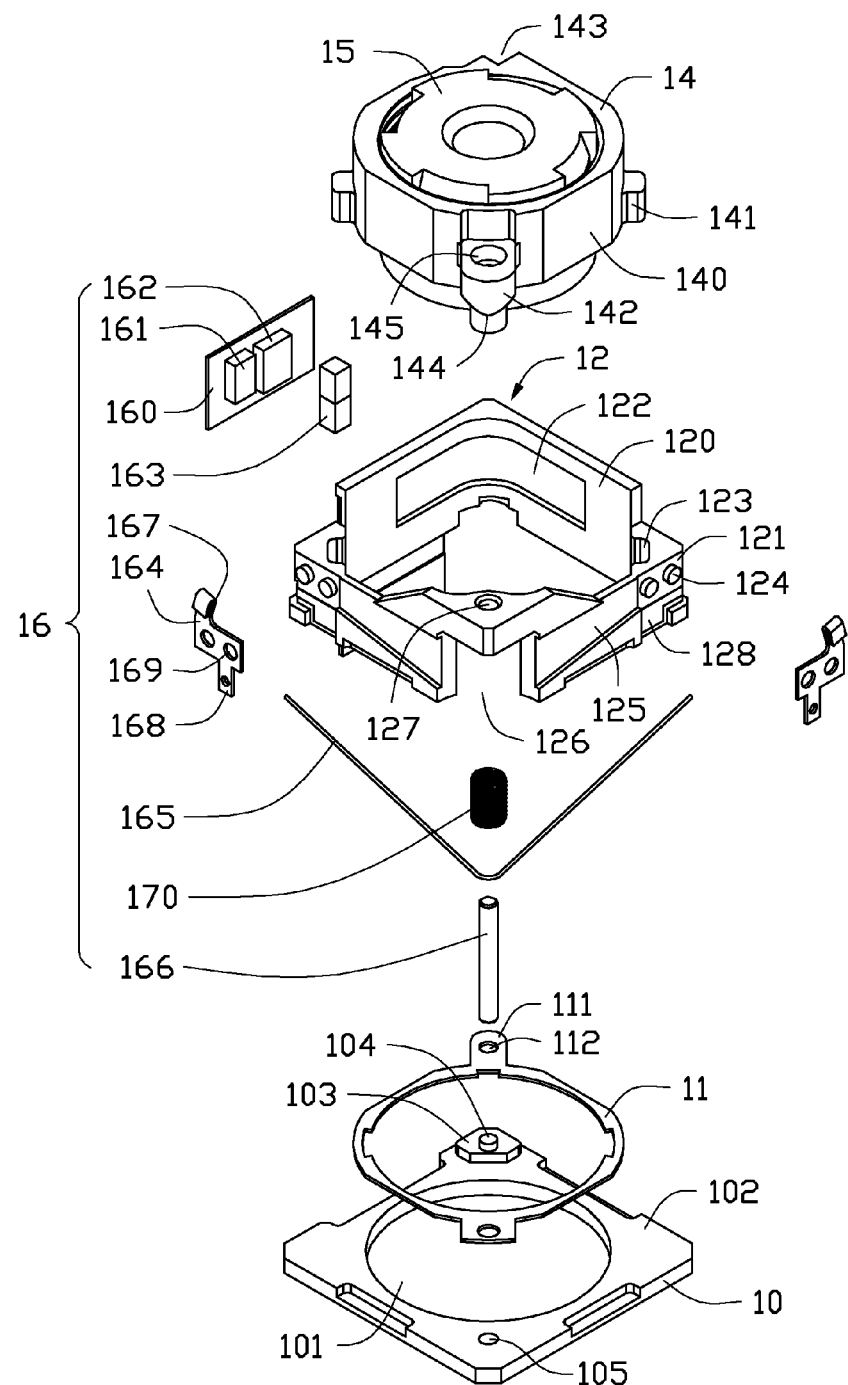
FIG. 2 is an exploded view of the camera module of FIG. 1.
Figure 3:
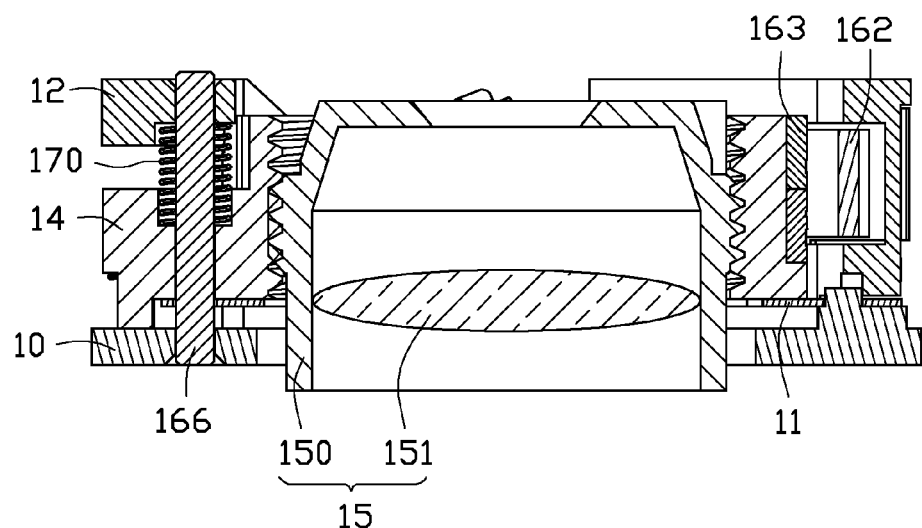
FIG. 3 is a cross-sectional view taken along line III-III of the camera module of FIG. 1.

FIGS. 1 to 3 show a camera module 100 according to an exemplary embodiment. The camera module 100 includes an actuator 200 and a lens unit 15. The actuator 100 includes a base 10, an elastic element 11, a stationary frame 12, a movable frame 14, and a driving unit 16.

The base 10 is flat and defines a light through hole 101. The base 10 further includes an upper surface 102. A step 103 is formed at a corner of the upper surface 102. A positioning rod 104 is formed on the step 103. Another corner of the upper surface 102 far away from the step 103 defines a fixing hole 105.

The elastic element 11 is ring shaped. The inner diameter of the elastic element 11 is bigger than the diameter of the light through hole 101. The elastic element 11 includes two opposite lugs 111. Each lug 111 defines a positioning hole 112.

The stationary frame 12 is substantially a square barrel. The stationary frame 12 includes two adjacent first sidewalls 120 and two adjacent second sidewalls 121. The two first sidewalls 120 cooperatively define a receiving slot 122. A sliding groove 123 is defined at the boundary of each first sidewall 120 and each second sidewall 121. Each second sidewall 121 includes two fixing rods 124 and a receiving recess 125 on an outer surface thereof. The two fixing rods 124 are adjacent to the respective first sidewall 120. The receiving recess 125 extends from the fixing rods 124 to another first sidewall 120. A cutout 126 is defined at a bottom portion of the boundary of the two second sidewalls 121. A guiding hole 127 is defined at an upper portion of the boundary of the two second sidewalls 121. The guiding hole 127 is a stepped hole. Laser direct structuring lines (LDS line) 128 are formed on an outer surface of the stationary frame 12. The LDS lines 128 extend from the second sidewalls 121 to the first sidewalls 120.

The movable frame 14 is a circular barrel. The movable frame 14 receives the lens unit 15. The lens unit 15 is threadedly engaged with the movable frame 14. The lens unit 15 includes a lens barrel 150 and a lens 151 received in the lens barrel 150. The movable frame 14 includes two opposite sliding blocks 141, an arc-shaped lug 142, and a receiving groove 143 on an outer surface 140 therefrom. The lug 142 is stepped, and includes a resisting surface 144 adjacent to and facing the base 10. The lug 142 defines a stepped through hole 145.

The driving unit 16 includes a circuit board 160, a controller 161 mounted on the circuit board 160, a position sensor 162, a magnet 163, two metal clips 164, a shape memory alloy line (SMA line) 165, a guide pole 166, and a spring 170. In this embodiment, the position sensor 162 is a hall sensor. Each metal clip 164 defines two fastening holes 169. Each metal clip 164 further includes a clipping portion 167 and a soldering pin 168.

During assembly, the elastic element 11 is put on the base 10. The positioning rod 104 extends through one of the positioning holes 112. The guide pole 166 extends through the other positioning hole 112 and is inserted into the fixing hole 105, to fix the elastic element 11 on the base 10. The magnet 163 is adhered in the receiving groove 143 of the movable frame 14. The movable frame 14 is adhered to the elastic element 11. The guide pole 166 extends through the stepped through hole 145 of the movable frame 14. The spring 170 is sleeved over the guide pole 166. The spring 170 is partly received in the stepped through hole 145. The stationary frame 12 is adhered to the base 10. The sliding blocks 141 are received in the sliding grooves 123. The lug 142 is positioned in the cutout 126. The guide pole 166 extends through the guiding hole 127. The spring 170 is positioned between movable frame 14 and the stationary frame 12. Each of the metal clips 164 is fixed on the stationary frame 12 by the engagement of its fixing holes 169 and the respective fixing rods 124. The soldering pins 168 are soldered to the LDS lines 128. The SMA line 165 is received in the receiving recesses 125 of the two second sidewalls 121. Two ends of the SMA line 165 are clipped in the clipping portions 167 of the two metal clips 164. A portion of the SMA line 165 at the cutout 126 resists on the resisting surface 144. The circuit board 160 is fixed on the stationary frame 12. The controller 161 and the position sensor 162 are received in the receiving slot 122. The position sensor 162 is aligned with the magnet 163. The LDS lines 128 are connected to the circuit board 160 by soldering. In this way, the actuator 200 is assembled.

When working, the controller 161 supplies current to the SMA line 165 through the LDS lines 128 and the metal clips 164. The SMA line 165 is heated and becomes shorten. The shorten SMA line 165 drives the movable frame 14 to move along the guide pole 166 and towards a direction far away from the base 10, to change the focus distance of the lens unit 15 fixed in the movable frame 14.

When the movable frame 14 moves, the position sensor 162 detects the magnetic field strength of the magnet 163 to acquire the position of the movable frame 14. The position sensor 162 further sends the detected result to the controller 161. The controller 161 adjusts the current according to the detected result, so that the SMA line 165 can drive the movable frame 14 to move to a predetermined position precisely. For example, if the movable frame 14 exceeds the predetermined position, the controller 161 decreases the current to make the movable frame 14 move back to the predetermined position. If the movable frame 14 does not reach the predetermined position after a predetermined time, the controller increases the current to make the movable frame 14 move to the predetermined position.

When the movable frame 14 moves towards the direction far away from the base 10, the elastic element 11 is elongated, and the spring 170 is compressed. When the controller 161 stops to supply current to the SMA line 165, the SMA line 165 becomes longer, the elastic element 11 and the spring 170 recover and drive the movable frame 14 to an original position.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An actuator comprising:
    a base comprising a step and a positioning rod extending from the step;
    a stationary frame fixed on the base;
    a movable frame received in the stationary frame, the movable frame comprising a resisting surface adjacent to the base, the movable frame defining a through hole;
    a shape memory alloy (SMA) line, the SMA line resisting on the resisting surface, two ends of the SMA line fixed on the stationary frame;
    a guide pole, one end of the guide pole fixed on the base, and the other end of the guide pole extending through the through hole;
    an elastic element being ring shaped and comprising two opposite lugs, each lug defining a positioning hole, the positioning rod extending through the positioning hole of one of the lugs, the guide pole passing through the positioning hole of the other lug;
    a position sensor configured for detecting the position of the movable frame; and
    a controller in communication with the position sensor, wherein the controller is configured for supplying current to heat the SMA line to change a length of the SMA line, the SMA line drives the movable frame to move along the guide pole accordingly, the controller is further configured for adjusting the current according to the position of the movable frame detected by the position sensor.

2. The actuator of claim 1, wherein the stationary frame is adhered to the base.

3. The actuator of claim 1, wherein the stationary frame defines a guiding hole, the other end of the guide pole far away from the base extends through the guiding hole.

4. The actuator of claim 3, further comprising a spring sleeved over the guide pole and positioned between the stationary frame and the movable frame.

5. The actuator of claim 1, wherein the position sensor is a hall sensor fixed on the stationary frame, the actuator comprises a magnet fixed on the movable frame and aligned with the hall sensor.

6. The actuator of claim 1, further comprising two metal clips fixed on the stationary frame, the two ends of the SMA line are clipped by the two metal clips respectively.

7. The actuator of claim 6, further comprising laser direct structuring (LDS) lines, the LDS lines connecting the metal clips to the controller.

8. The actuator of claim 1, wherein the resisting surface faces the base.

9. The actuator of claim 1, wherein the movable frame comprises two opposite sliding blocks; the stationary frame defines two opposite sliding grooves; each of the sliding grooves receives a respective one of the sliding blocks.

10. The actuator of claim 1, wherein the movable frame comprises an arc-shaped lug, and the arc-shaped lug defines the through hole; the stationary frame defines a cutout, and the cutout receives the arc-shaped lug.

11. A camera module comprising:
    a base comprising a step and a positioning rod extending from the step;
    a stationary frame fixed on the base;
    a movable frame received in the stationary frame, the movable frame comprising a resisting surface adjacent to the base, the movable frame defining a through hole;
    a shape memory alloy (SMA) line, the SMA line resisting on the resisting surface, two ends of the SMA line fixed on the stationary frame;
    a guide pole, one end of the guide pole fixed on the base, and the other end of the guide pole extending through the through hole;
    an elastic element being ring shaped and comprising two opposite lugs, each lug defining a positioning hole, the positioning rod extending through the positioning hole of one of the lugs, the guide pole passing through the positioning hole of the other lug;
    a position sensor configured for detecting the position of the movable frame; and
    a controller in communication with the position sensor, wherein the controller is configured for supplying current to heat the SMA line to change a length of the SMA line, the SMA line drives the movable frame to move along the guide pole accordingly, the controller is further configured for adjusting the current according to the position of the movable frame detected by the position sensor; and
    a lens unit received in the movable frame.

12. The camera module of claim 11, wherein the lens unit comprises a lens barrel and a lens received in the lens barrel.

13. The camera module of claim 11, wherein the stationary frame is adhered to the base.

14. The camera module of claim 11, wherein the stationary frame defines a guiding hole, the other end of the guide pole far away from the base extends through the guiding hole.

15. The camera module of claim 14, wherein the actuator further comprises a spring sleeved over the guide pole and positioned between the stationary frame and the movable frame.

16. The camera module of claim 11, wherein the position sensor is a hall sensor fixed on the stationary frame, the actuator comprises a magnet fixed on the movable frame and aligned with the hall sensor.

17. The camera module of claim 11, wherein the actuator further comprises two metal clips fixed on the stationary frame, the two ends of the SMA line are clipped by the two metal clips respectively.

18. The camera module of claim 17, wherein the actuator further comprises LDS lines, and the LDS lines connect the metal clips to the controller.

* * * * *